US008920222B2

(12) United States Patent
Jansen et al.

(10) Patent No.: US 8,920,222 B2
(45) Date of Patent: Dec. 30, 2014

(54) METHOD AND APPARATUS FOR MECHANICALLY PROCESSING AN ORGAN OR ORGANS TAKEN OUT FROM SLAUGHTERED POULTRY

(75) Inventors: Tom Cornelis Jansen, Oostzaan (NL); Remco Spijker, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 335 days.

(21) Appl. No.: 13/157,794

(22) Filed: Jun. 10, 2011

(65) Prior Publication Data

US 2011/0244773 A1 Oct. 6, 2011

Related U.S. Application Data

(62) Division of application No. 12/408,496, filed on Mar. 20, 2009.

(30) Foreign Application Priority Data

Mar. 20, 2008 (EP) ..................................... 08102829

(51) Int. Cl.
*A22C 21/06* (2006.01)
*A22C 17/14* (2006.01)
(52) U.S. Cl.
CPC ................. *A22C 17/14* (2013.01); *A22C 21/06* (2013.01)
USPC .......................................... 452/112; 452/111
(58) Field of Classification Search
USPC .......................................... 452/106, 111–114
See application file for complete search history.

(56) References Cited

U.S. PATENT DOCUMENTS

| | | | |
|---|---|---|---|
| 2,516,499 A | 7/1950 | Albright |
| 2,738,547 A | 3/1956 | Zebarth |
| 3,172,148 A | 3/1965 | Hill |
| 3,579,714 A | 5/1971 | Edwards, Sr. |
| 3,908,817 A | 9/1975 | Neville et al. |
| 4,057,875 A | 11/1977 | Hill |
| 4,090,275 A | 5/1978 | Jorgensen et al. |
| 4,215,450 A | 8/1980 | Poss |

(Continued)

FOREIGN PATENT DOCUMENTS

| | | |
|---|---|---|
| DE | 12 02 722 B | 10/1965 |
| DE | 41 05 564 A1 | 8/1992 |

(Continued)

OTHER PUBLICATIONS

Partial European Search Report for EP 08 10 2829, dated Jul. 25, 2008.

(Continued)

*Primary Examiner* — David Parsley
(74) *Attorney, Agent, or Firm* — Dority & Manning, P.A.

(57) ABSTRACT

Method and apparatus are provided for mechanically processing an organ or organs taken out from slaughtered poultry in a processing device or processing line, which organ or organs form part of an organ package and wherein the organ or organs are separated from the organ package. The organ package is spatially oriented by the processing device without notably breaking tissue connections in the package, and in a preselected order so as to cause the harvesting of organs from the package to occur in a preselected sequence that depends on the location of the organ package in the processing device or processing line.

16 Claims, 8 Drawing Sheets

(56) References Cited

U.S. PATENT DOCUMENTS

| | | | |
|---|---|---|---|
| 4,538,325 A * | 9/1985 | Harben et al. ............... | 452/112 |
| 4,570,296 A * | 2/1986 | Hill et al. .................... | 452/112 |
| 4,590,643 A * | 5/1986 | Hill ............................. | 452/112 |
| 4,608,732 A | 9/1986 | Hill et al. | |
| 4,648,156 A | 3/1987 | Meyn | |
| 4,682,386 A | 7/1987 | Hazenbroek et al. | |
| 4,691,410 A | 9/1987 | Risser et al. | |
| 4,691,412 A | 9/1987 | Brown | |
| 4,715,092 A | 12/1987 | Lerner et al. | |
| 4,748,722 A | 6/1988 | Risser et al. | |
| 4,799,292 A | 1/1989 | Harben, III | |
| 4,815,166 A | 3/1989 | Martin et al. | |
| 4,827,570 A | 5/1989 | Scheier et al. | |
| 4,951,352 A * | 8/1990 | Harben et al. ............... | 452/106 |
| 4,951,354 A | 8/1990 | Callsen et al. | |
| 5,041,052 A * | 8/1991 | Conner et al. ............... | 452/106 |
| 5,041,053 A | 8/1991 | Ellis et al. | |
| 5,098,336 A | 3/1992 | DeLong | |
| 5,152,715 A * | 10/1992 | van de Eerden et al. ..... | 452/106 |
| 5,186,678 A * | 2/1993 | Conner et al. ............... | 452/106 |
| 5,197,917 A | 3/1993 | Verbakel et al. | |
| 5,242,324 A * | 9/1993 | Koops ........................... | 452/111 |
| 5,299,975 A | 4/1994 | Meyn | |
| 5,314,374 A | 5/1994 | Koch et al. | |
| 5,318,428 A * | 6/1994 | Meyn ........................... | 452/106 |
| 5,372,539 A | 12/1994 | Kunig et al. | |
| 5,407,383 A | 4/1995 | Diesing et al. | |
| 5,466,185 A | 11/1995 | Martin et al. | |
| 5,549,521 A | 8/1996 | Van den Nieuwelaar et al. | |
| 5,569,067 A * | 10/1996 | Meyn ........................... | 452/106 |
| 5,697,837 A | 12/1997 | Verrijp et al. | |
| 5,707,280 A | 1/1998 | Tieleman et al. | |
| 5,755,617 A * | 5/1998 | van Harskamp et al. ..... | 452/106 |
| 5,759,095 A * | 6/1998 | De Weerd .................... | 452/106 |
| 5,833,527 A | 11/1998 | Hazenbroek et al. | |
| 6,220,953 B1 | 4/2001 | Cornelissen et al. | |
| 6,283,847 B1 | 9/2001 | Berry et al. | |
| 6,382,401 B2 | 5/2002 | Takemoto et al. | |
| 6,599,179 B1 | 7/2003 | Hazenbroek et al. | |
| 6,638,155 B2 * | 10/2003 | Jensen et al. ................. | 452/117 |
| 6,935,942 B1 | 8/2005 | Evers et al. | |
| 7,017,730 B2 | 3/2006 | Mills et al. | |
| 7,066,806 B2 | 6/2006 | De Heer et al. | |
| 7,500,910 B2 | 3/2009 | Sorensen et al. | |
| 7,942,729 B2 | 5/2011 | Spijker et al. | |
| 2003/0181157 A1 | 9/2003 | Annema et al. | |
| 2006/0183413 A1 | 8/2006 | Florindo et al. | |

FOREIGN PATENT DOCUMENTS

| | | |
|---|---|---|
| EP | 0 141 432 A1 | 5/1985 |
| EP | 0 447 773 A1 | 9/1991 |
| EP | 0 482 700 A1 | 4/1992 |
| EP | 0 487 168 A1 | 5/1992 |
| EP | 0 541 150 A1 | 5/1993 |
| EP | 0 564 025 A1 | 10/1993 |
| EP | 0 141 432 A1 | 5/1995 |
| EP | 0 695 506 A2 | 2/1996 |
| EP | 0 800 768 A1 | 10/1997 |
| EP | 1 135 990 | 9/2001 |
| EP | 1 430 780 A1 | 6/2004 |
| EP | 1 454 531 A2 | 9/2004 |
| EP | 1 769 681 A1 | 4/2007 |
| NL | 1 033 604 | 9/2008 |
| WO | WO 00/33661 | 6/2000 |
| WO | WO 2008/094033 | 8/2008 |
| WO | WO 2008/118008 | 10/2008 |

OTHER PUBLICATIONS

Extended European Search Report for EP 08 10 2829, dated Oct. 2, 2008.

* cited by examiner

METHOD AND APPARATUS FOR MECHANICALLY PROCESSING AN ORGAN OR ORGANS TAKEN OUT FROM SLAUGHTERED POULTRY

PRIORITY CLAIM

This application is a divisional application of and claims priority to U.S. patent application Ser. No. 12/408,496 filed on Mar. 20, 2009, which is incorporated herein by reference for all purposes and is related to the concurrently filed U.S. patent application entitled "METHOD AND APPARATUS FOR MECHANICALLY PROCESSING AN ORGAN OR ORGANS TAKEN OUT FROM SLAUGHTERED POULTRY," assigned U.S. Ser. No. (not yet assigned) and filed Jun. 10, 2011.

TECHNICAL FIELD OF THE INVENTION

The invention concerns a method for mechanically processing an organ or organs taken out from slaughtered poultry in a processing device or processing line (the organ or organs forming part of an organ package) wherein the organ or organs are separated from the organ package. Usually the organ package taken out of the poultry also includes the intestines.

The invention also relates to a processing line for harvesting an organ or organs from an organ package taken out of slaughtered poultry, which processing line includes at least one processing device for processing an organ or organs from the organ package.

The processing device may, for instance, concern a divider unit that includes a conveyor for organ packages having conveyor pans forming part of the conveyor, which conveyor pans are intended to receive the organ packages. The processing device may, however, further concern an organ harvester, a gizzard processing device and/or a gizzard peeler as to be detailed hereinafter.

BACKGROUND OF THE INVENTION

EP-A-1 769 681 teaches a method and device for mechanically processing a cluster of organs of a slaughtered animal wherein the cluster is taken out of and separated from the body of the slaughtered animal. A clamping device is used to fix a particular organ within the cluster, and the cluster is conveyed along a predetermined path. Tissue connections in the cluster are then broken on the basis of the spatial orientation of the cluster, which is derived from the spot where the concerning organ is clamped.

In general, methods and processing lines for mechanically processing an organ or organs taken out of slaughtered poultry with the aim to harvest the separate organs from the organ package are suffering from diverse problems such as organ packages or organs thereof are lost during processing, damage occurs to organs such as the liver and the heart, and unintentionally certain organs such as gallbladders are not removed or organs are not entirely separated and cause obstructions in the processing line. Further problems are connected to the use of huge amounts of water and energy. Notably, the processing lines of the prior art also include many parts and are expensive while such lines are still suffering from the problem that the organ packages are not handled well.

SUMMARY OF EXEMPLARY EMBODIMENTS

Objects and advantages of the invention will be set forth in part in the following summary description, or may be obvious from the description, or may be learned through practice of the invention. A summary of certain exemplary embodiments and methods of the present invention will now be set forth.

With the invention it is intended to address at least some of the above-described problems and to provide an alternative solution to existing methods and machines for processing an organ or organs that form part of an organ package that is taken out of slaughtered poultry.

Accordingly, exemplary methods, several processing devices, and a processing line are proposed in accordance with the appended claims.

Basically, an exemplary method for mechanically processing an organ or organs that form part of an organ package is characterized in that the organ package is spatially oriented by the processing device without notably or substantially breaking tissue connections in the package and in a preselected order so as to cause the harvesting of organs from the package to occur in a preselected sequence that depends on the location of the organ package in the processing device or processing line. This contributes to the entirely automatic processing of such organ packages wherein the collection of the organs takes place with the least possible damage and in an orderly fashion, obviating the otherwise general need to inspect and check whether all collected organs at a particular point are of the same type, such that hearts go to hearts, livers go to livers, and gizzards go to gizzards.

The benefit of the exemplary method of the invention particularly comes into view due to the feature that the organ package is conveyed to the processing device or processing line such that the organs in the package are randomly oriented. The handling and the processing of the organ package thus occurs in a very robust manner that is rather insensitive to disturbances due to the manner of presentation or introduction of the organ package to the processing device or processing line.

In order to promote a swift operation it is further advantageous that the spatial orientation of the organ package is carried out while simultaneously the organ or organs in the package are directly subjected to a propulsive force for moving the package through the processing device or processing line.

The processing of the organs or organ that form part of the organ package is preferably carried out by separating the edible parts from the inedible parts of the organ package. In this respect it is preferred that the harvesting of organs occurs after removing the non-edible parts from the organ package, such as the gallbladder, and other parts such as the intestines and the crop.

To promote the removal of the gallbladder from the organ package, which further comprises a duodenum, it is beneficial that this duodenum is drawn away from the remainder of the organ package so as to expose tissue connections between the gallbladder and other parts of the organ package to a cutting instrument.

Another aspect of this exemplary method according to the invention is that harvesting of organs is executed by tearing or cutting tissue connections that connect the organs to the remainder of the organ package.

The invention is also embodied in a processing line in which an exemplary method of the invention can be employed and that serves for harvesting an organ or organs from an organ package taken out from slaughtered poultry. Such a processing line includes at least one processing device in which the organ or organs from the organ package are processed.

An exemplary such processing device has at least an entry and an exit and processing means arranged between the entry and exit that are arranged for simultaneously providing a preselected orientation to the organ package and propagating the organ package from the entry to the exit. The processing device is provided with waste discharge means for disposal of inedible portions from the organ package.

In order to answer to increasing demand for automatic processing of the organ packages it is preferable that the processing line incorporates a series of processing devices for sequentially harvesting from an organ package one or more organs from the group comprising a heart, a liver, a gizzard (i.e. ventriculus) with a pre-stomach (i.e. proventriculus) attached thereto. One of the processing devices may be an organ harvester for harvesting an organ selected from the group that includes the heart, liver, gizzard, pre-stomach, and combinations thereof, and/or a gizzard peeler.

In such an automatic processing line, normally it is preferred to include a gizzard processing device for separating a pre-stomach from a gizzard and a gizzard peeler for subsequently peeling said gizzard. Wherever in this document reference is made to a gizzard this refers to the ventriculus, and wherever reference is made to a pre-stomach this refers to the proventriculus.

A further aspect of the processing line according to exemplary embodiments of the invention is that it may comprise a divider unit in a conveyor line for transporting organ packages, for selectively transferring organ packages from the conveyor line to parallel sub-lines for harvesting organs from the organ packages in each of the parallel sub-lines. By these means it is possible to effectively increase the processing capacity of the processing line by setting up an appropriate number of parallel sub-lines that are fed by the divider unit.

In still a further embodiment of the invention, the divider unit that includes a conveyor for organ packages, also includes conveyor pans that form part of the conveyor for receiving therein the organ packages, whereby each of the pans is mounted on a bar or bars of the conveyor. The bar or bars are arranged perpendicular to the conveyor's conveying direction. Positioning means are provided that cooperate with selected ones of the conveyor pans for positioning such pans along the bar bars so as to move the respective pans and the organ packages contained therein to preselected entries of further processing devices downstream of the conveyor.

An effective way of executing the positioning means for the conveyor pans is to execute them as diverting tracks whereby the conveyor pans have pins of wheels attached thereto that cooperate with the diverting tracks.

Further in accordance with the exemplary embodiments of invention, an organ harvester is proposed that has an in-feed for organ packages and one or more exits for an organ or organs that are separated from the organ packages. Conveyor means are provided for moving the organ packages or parts thereof from the in-feed towards the exit or exits. The conveyor means are arranged to bring the organ packages in a predetermined orientation wherein inedible portions of the packages including the duodenum are below edible portions of the packages. This allows for an accurate separation of the edible portions from the inedible portions of the package.

Preferably, the conveyor means cooperate with stopping means for temporarily delaying the movement of the organ packages in the conveying direction so as to prolong the conveyor means acting on the organ packages for providing it with the predetermined orientation.

Whether or not the stopping means are employed, in exemplary embodiments of the organ harvester of this invention it is proposed that downstream of the conveyor means is a first separator for detaching the inedible portions from the organ package.

A specific feature of the organ harvester according to exemplary embodiments of the invention is that the first separator is a cutter with catch and drawing means below the cutters, The catch and drawing means are arranged to catch part of the inedible portions of the organ package and subsequently draw the portions so as to cause the cutter to effectively cuts the tissue connections between the inedible portions and the remainder of the organ package.

Effectively, the catch and drawing means are executed as cooperating rollers having during operation opposite rotational directions. The rollers each are provided with a first section having a first radius and a second section having a second radius, wherein the first radius is larger than the second radius. The rollers are arranged such that during operation the respective first sections and the respective second sections of the rollers execute a mirror-image movement.

This is preferably arranged such that the cooperating rollers of the catch and drawing means have at the first sections intermeshing teeth, and the second sections of the rollers define a nip in between them when the second sections are adjacent to each other. The nip is effective for catching the concerning inedible portions of the organ package therein.

The cutting of the tissue connections is most securely effected when the cutter has a central tongue and slits on both sides adjacent thereto for receiving in at least one of the slits tissue connections of the organ package. The central tongue and/or said slits are provided with cutting edges.

The inventors have found it advantageous that the conveyor means include at least one endless belt that cooperates with a transport-unit selected from the group that includes a second endless belt and a roller. Between the at least one endless belt and the transport-unit a nip is provided that allows inedible portions of the organ packages to pass through.

Particularly the at least one endless belt contributes to the effective combined operation on the organ packages wherein the package is conveyed in its intended direction and simultaneously processed by the organ harvester such that a separation occurs from edible portions and inedible portions of the organ package. To promote the effective operation of the conveyor means, it is desirable that the at least one endless belt and the transport-unit each are provided circumferentially with cooperating grooves that during operation move in opposite rotational directions, and notably that the at least one endless belt and/or the second endless belt each have a direction of movement that is perpendicular to the conveying direction of the conveyor means.

A very special feature of the endless belt is that adjacent to the transport-unit the grooves of the at least one endless belt are shaped as part of a pitched groove and that distant from the transport-unit the grooves of the at least one endless belt are shaped as staggered groove portions. This feature contributes tremendously to the effectivity of both the conveying function (due to the pitched groove adjacent the transport-unit) and the separation, function which is heavily promoted by the grooves having staggered portions at locations distant from the transport-unit.

It is advantageous that downstream of the conveyor means is a second separator for separating an organ or organs from the organ packages, wherein in the conveying direction the second separator is located behind the first separator.

The design of the second separator is preferably such that it includes at least two cooperating first rollers that are at least in part circumferentially provided with grooves. The first rollers define a preferably adjustable nip between the rollers for selectively allowing preselected first organs from the organ package to pass through. During operation the first rollers rotate in opposite directions in order to convey the organ packages and simultaneously promote the preselected first organ or organs to pass through the nip.

In order to secure transport of the organ packages at this point and to effectively execute the selective separation of organs from the organ packages at predetermined positions thereafter, the second separator comprises at least in part of the organ packages' path of conveyance a screw transporter.

Particularly the separation function benefits from positioning the screw transporter above the supporting means for the organ or organs to be transported. The supporting means are cooperating second rollers with at least in part a smooth surface. The second rollers have a nip in between preventing the passage therethrough of a preselected second organ or organs.

The supporting means and screw transporter are preferably so dimensioned that the screw transporter and the supporting means define a space for receiving therein the organ or organs.

A further aspect of the organ harvester of the invention is that the first rollers and the second rollers are unitary and define a narrowing nip in between the rollers as seen in the conveying direction of the rollers, so as to cause the preselected first organs to be moved through the nip at the wider part of the nip whilst preselected second organs remain supported and conveyed by the rollers. This promotes selective harvesting of organs at preselected positions along the processing line.

A further desirable feature of the organ harvester according to the invention is that the screw transporter includes an axis that is circumferentially provided with a spiraling wall, wherein adjacent parts of the wall are spaced apart so as to enable receiving a preselected second organ or organs there between. There is a closing wall at the exit of the screw transporter that connects the adjacent parts of the spiraling wall. The closing wall acts as separating means for the last organ to be separated from the organ packages such that during operation the closing wall (which is arranged at the exit of the screw transporter) provides a pulling force on a preselected second organ or organs in order to break tissue connections that connect the second organ or organs to a preselected first organ or organs that are arranged below the cooperating rollers that support the second organ or organs of the organ packages. Also, the screw transporter is otherwise arranged such that it separates and detaches the preselected first organs from the preselected second organs of the organ package.

Although the organ package can have a diversity of organs, it is preferable that the organ package includes at least a heart and/or a liver and/or a gizzard and/or a pre-stomach and that the organ harvester supplies these organs or a selection thereof through its exit or exits. Hence at predetermined points harvesting of subsequently liver, heart, and gizzard with pre-stomach can occur.

The invention is further embodied in a gizzard processing device having an in-feed for an unprocessed gizzard-package and an exit or exits for parts of the gizzard-package such as a pre-stomach and/or a gizzard. This gizzard processing device in accordance with exemplary aspects of the invention includes an in-feed that has cooperating rollers having helically shaped grooves for positioning the gizzard-package in an upright position with the gizzard above the pre-stomach for transporting the gizzard-package in its conveying direction.

The gizzard processing device preferably is provided with a cutting device near the end of the cooperating rollers for breaking the tissue connections between the gizzard and the pre-stomach.

Advantageously, the gizzard processing device includes a slope portion with a centrally positioned knife and slopes extending on both sides of the knife at a predetermined angle with respect to the knife. By these means the gizzard can be easily opened and subsequently spread into a so called butterfly shape.

To this end it is preferred that the slopes extend symmetrically on both sides of the knife and that the angle of the slopes gradually develops as seen in the conveying direction of the gizzard so as to cause the gizzard, after being cut by the knife, to be spread into a completely open shape.

It is further desirable that there is a washing beam for the gizzards that includes grooves and a water supply having its outlet or outlets in the grooves for washing out the gizzard's contents. By these means the contents of the gizzards such as stones may easily be washed out.

The washing beam is normally located behind the slope portion as seen in the gizzard's conveying direction. Further aspects of the invention are embodied in a gizzard peeler that may be combined with the gizzard processing device of the invention or be applied independently.

The gizzard peeler of the invention has an in-feed for an opened gizzard and an exit for a peeled gizzard and is provided with transportation means for moving the gizzard from the in-feed to the exit. Both the in-feed and the exit may be provided with washing drums for washing the opened gizzard and the peeled gizzard respectively. The gizzard peeler is further characterized in that it includes a series of rollersets. Each rollerset includes a first roller and a second roller that in use rotate in opposite directions. Due to this opposite rotation of the rollers in each rollerset a very effective peeling of the gizzard can take place.

A further characterizing feature of the gizzard peeler according to the invention is that each of the rollersets partly borders a space that is arranged for receipt of the gizzard.

Thus, it is possible that the rollersets collectively form a substantially cylindrical case or form part of such a case for the gizzard. The cooperating rollers of each rollerset does not only provide effective peeling but also ensure transportation from the gizzard from the in-feed section to the exit of the peeler.

To promote the peeling of the gizzards it is further desirable that the rollersets are rotatable around a central body axis of the case.

The gizzard peeler of the invention can effectively be executed such that it is provided with a rotatable plate having a circular series of holes. The first roller of each rollerset has its axis received in one of the holes such that each hole receives one of the axes, and that a gear is provided that intermeshes with teeth provided on selected rollers of said rollersets. Due to the combined operation of the rotatable plate and the gear, the rollers of the rollersets can be put in concerted motion.

It is further desirable that the first and second rollers of each rollerset have intermeshing teeth. This ensures coordinated action of the first and second rollers of each roller-set. This is preferable such that the gear intermeshes with only one selected roller of each rollerset and that the non-selected roller only intermeshes with the selected roller.

It is further desirable that the intermeshing teeth of the first and second roller are helically shaped. This is most effective for both the transportation function and the peeling function of the rollers that are comprised in each rollerset.

A further beneficial feature of the gizzard peeler of the invention is that a stopper disc is provided between the in-feed and the exit. This can effectively prolong the peeling action on the gizzards.

It is proposed that the stopper disc have a central portion which is circumferentially provided with resilient flaps.

The invention will hereinafter be further elucidated with reference to a processing line in which several processing devices in accordance with the invention are employed.

BRIEF DESCRIPTION OF THE DRAWINGS

With respect to the processing line and the processing devices that are part thereof, reference is made to the drawings in which.

Wherever in the figures the same reference numerals are applied, these numerals refer to the same or similar features or parts of the devices shown.

DETAILED DESCRIPTION OF EMBODIMENTS OF THE INVENTION

Figure 1:
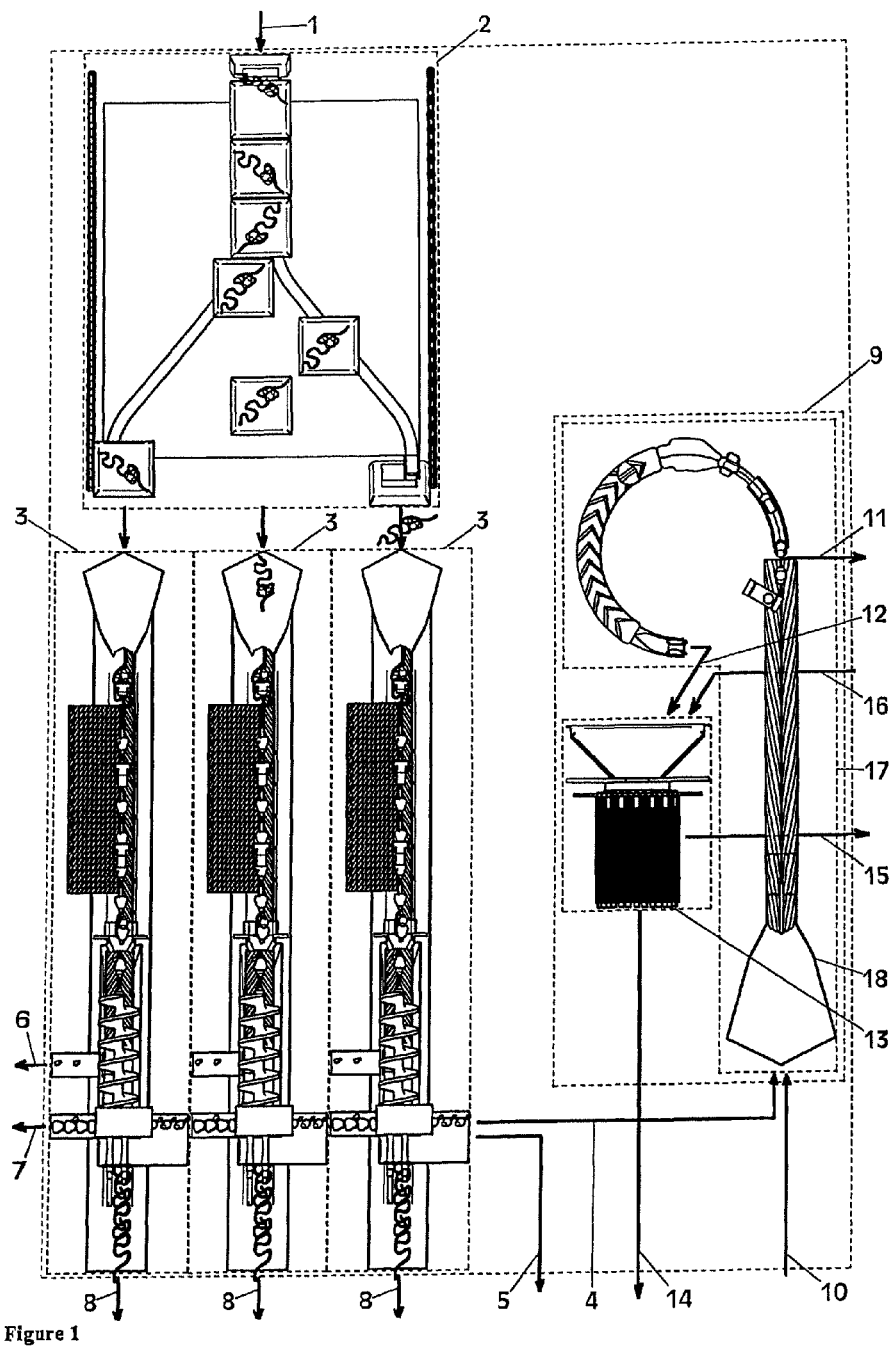
FIG. 1 provides a top view of a processing line according to an exemplary embodiment of the invention.

With reference first to FIG. 1 a top view is shown of a processing line for harvesting an organ or organs from an organ package taken out from slaughtered poultry wherein subsequently different processing devices are employed that can also be employed independently and separate from the other processing devices that are placed in the processing line.

Organ packages are supplied by means of an endless conveyor 1. The conveyor 1 may have any conventional form such as an endless conveyor with pans in which the organ packages are transported, but may also be embodied in the form of transport shackles which can be commanded to release the organ packages at the entrance of at least one processing line or at the location of a divider unit 2 if multiple processing (sub-)lines are employed. The divider unit 2 divides the stream of organ packages into as many parallel streams as desired. The figure shows that the division occurs into three parallel lines, with each line including at least one organ harvester 3 for harvesting hearts at exit 6, livers at exit 7, and gizzards with pre-stomach at exit 4. Exit 4 connects to a gizzard processing device as will be discussed hereinafter. Further, exit 8 is provided for disposal of inedible portions of the organ packages that are processed in the organ harvester 3 of the concerning line. An exit 5 for gizzards with pre-stomach is provided in case it is not intended to further process these gizzards.

If the gizzards with pre-stomach are intended to be further processed they can be entered at an in-feed 18 of a gizzard processing device 17, which is followed by a gizzard peeler 13 providing peeled gizzards at its exit 14. Any waste leaves the gizzard processing device 17 at exit 11 and leaves the gizzard peeler 13 at its exit 15.

The gizzard peeler 13 also includes a separate entry 16 for manually inputting any gizzards which require a further peeling operation. The gizzard processing device 17 together with the gizzard peeler 13 are indicated with reference numeral 9.

Figure 2:
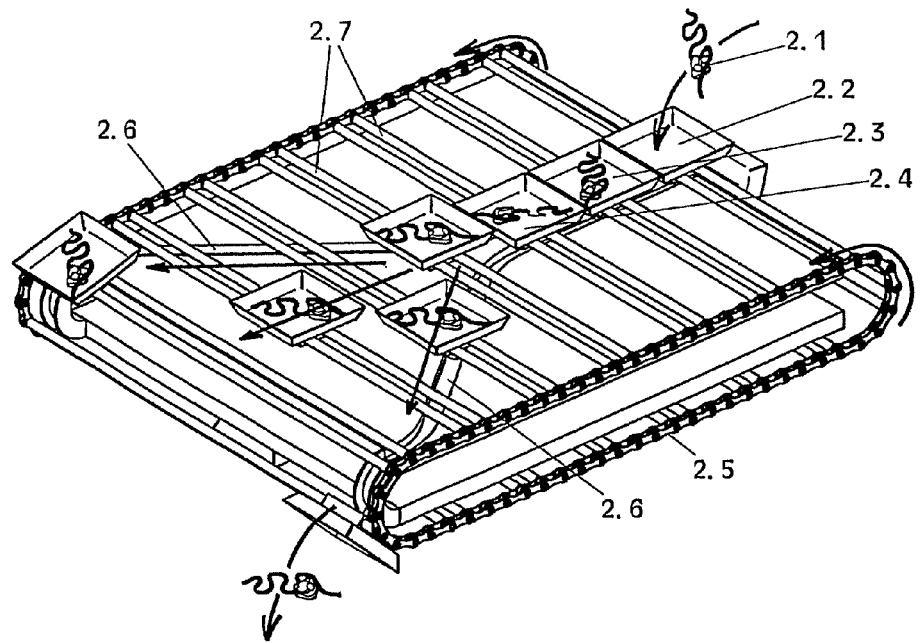
FIG. 2 shows in perspective a divider unit in accordance with an exemplary embodiment of the invention.

FIG. 2 separately shows the divider unit of an exemplary embodiment of the invention.

This divider unit can be used with particular advantage in high speed modern slaughter houses in which more than 12000 birds per hour are processed. With the application of the divider unit the organ packages that are obtained from the birds can be divided over several parallel processing sub-lines in order to reduce the processing speed that is required for each separate processing sub-line.

The divider unit of the invention employs an endless conveyor chain 2.5 to which pans 2.2, 2.3 and 2.4 are attached. Into the conveyor pans 2.2, 2.3 and 2.4, the organ packages are delivered at the in-feed part 2.1 of the divider unit.

As FIG. 2 clearly shows, the conveyor pans 2.2, 2.3 and 2.4 are slideably mounted on bars 2.7 which are perpendicular to the conveying direction of the divider unit. Provision is further made for positioning means 2.6 that cooperate with the conveyor pans 2.2, 2.3 and 2.4 for positioning the pans along the bar or bars 2.7 so as to move the respective pans 2.2, 2.3 and 2.4 and the organ packages contained in the pans to preselected entries of further processing devices, and in particular to the organ harvester 3 (see FIG. 1) that is placed downstream of the divider unit.

Figure 3:
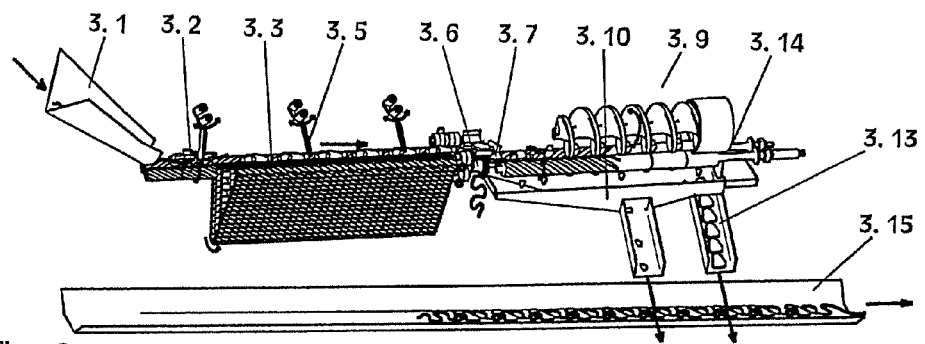
FIG. 3 shows schematically and in perspective an organ harvester in accordance with an exemplary embodiment of the invention.

With reference to FIG. 3, the organ harvester 3 as shown in FIG. 1 is schematically shown in a perspective view. Parts of this organ harvester that are not relevant for the disclosure of the invention are omitted.

Figure 5:
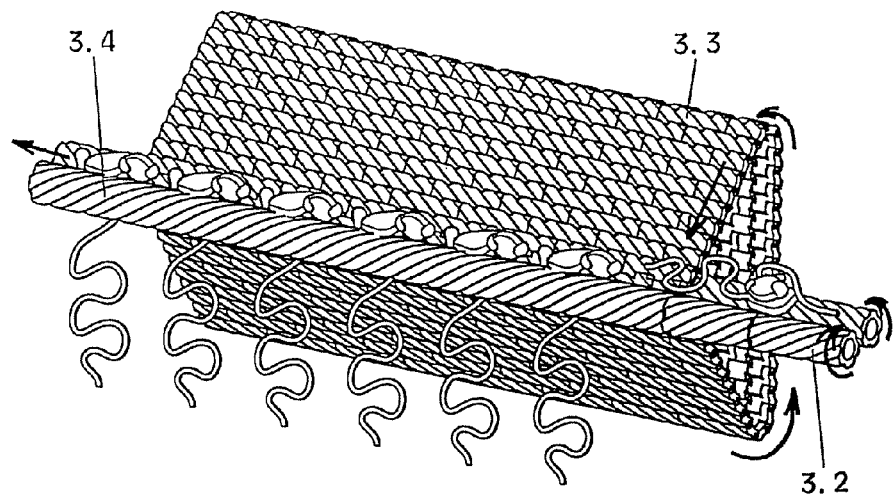
FIG. 5 and FIG. 6 show conveyor means as employed in the organ harvester of FIG. 3.

During operation, organ packages can be thrown or released into the gutter 3.1 whereby the organ packages have a random orientation. From the gutter 3.1, the organ packages are dropped onto in-feed giblet rollers 3.2 (for a clearer picture see also FIG. 5 and Fig, 6). The in-feed giblet rollers 3.2 are preferably conically shaped creating an opening between the rollers allowing the intestines forming part of the organ packages to pass through.

Followed by the in-feed giblet rollers 3.2 is a giblet belt 3.3, which in the shown embodiment is combined with a transport-unit in the form of a roller 3.4 (see FIG. 5), but which may also be replaced by a second giblet belt as the one shown with reference numeral 3.3. The combined operation of the giblet belt 3.3 and the transport-unit 3.4 forces the softer parts of the organ packages, including the duodenum, underneath the opening between the transport-unit 3.4 and giblet belt 3.3 leaving the heart, liver and gizzard with pre-stomach on top.

Figure 6:
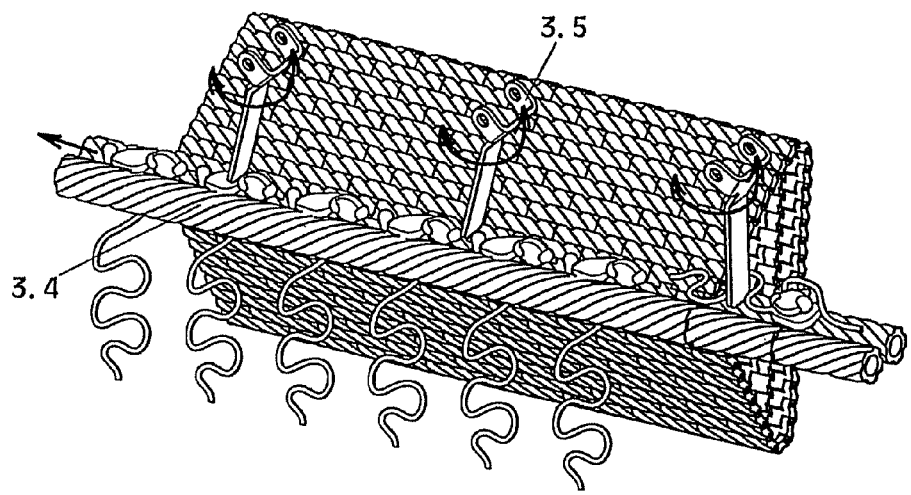

With reference again to FIG. 3 and FIG. 6, there are preferably also hinging stopping plates 3.5 to slow down the organ packages so as to improve the drawing of the intestines underneath the opening between the transport-unit 3.4 and giblet belt 3.3.

Downstream of the conveyor means 3.3, 3.4 is a first separator 3.6 (FIG. 3) that has the purpose of removing the inedible parts of the organ package, so as to leave the heart, liver, gizzard, and pre-stomach undamaged.

This first separator is shown in detail in FIG. 4A-4C respectively and is provided with a cutter 4.1 and with catch and drawing means 4.2 below said cutter 4.1. The catch and drawing means 4.2 are arranged to catch part of the inedible portions 4.3 of the organ package and subsequently draw the portions so that the cutter 4.1 can effectively cut the tissue connections between the inedible portions 4.3 and the remainder of the organ package 4.4 which is on top of the separator.

Figure 4A:
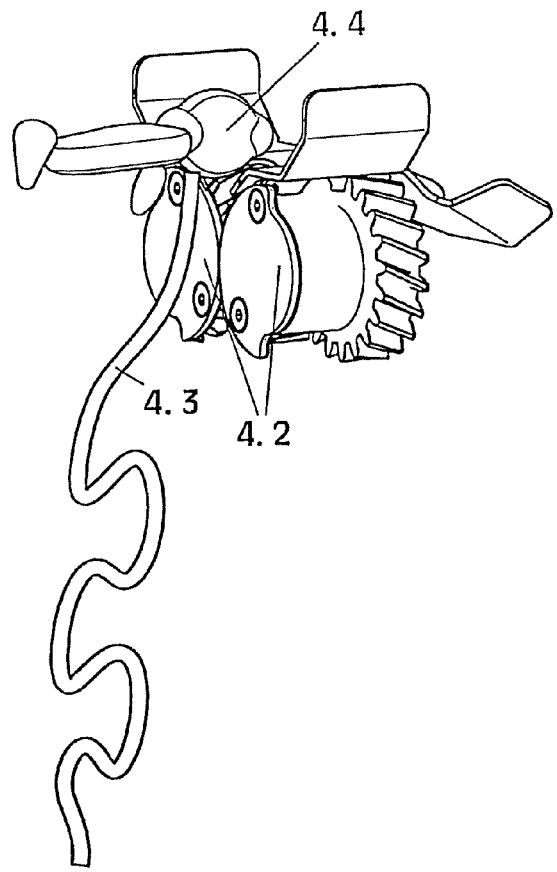
FIGS. 4A, 4B and 4C show a first separator of the organ harvester shown in FIG. 3.
Figure 4B:
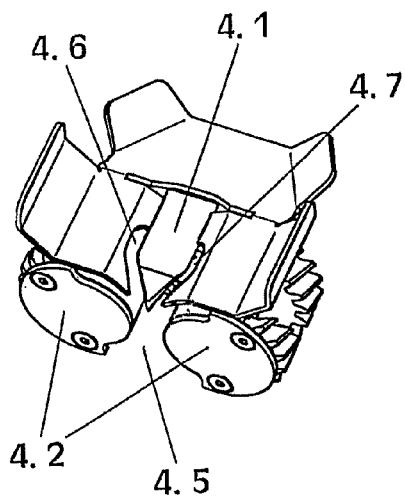
Figure 4C:
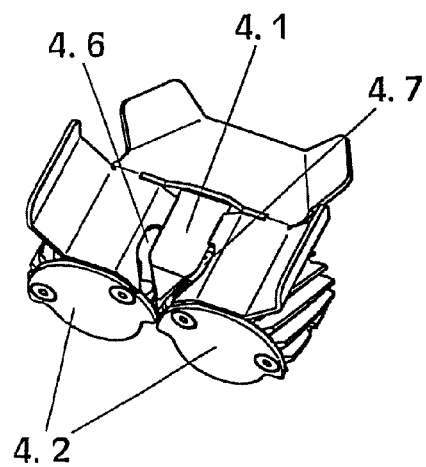

As FIGS. 4A-4C show, the catch and drawing means 4.2 are executed as cooperating rollers. These cooperating rollers have during operation opposite rotational directions and are provided with a first section having a first radius and a second section having a second radius, wherein the first radius is larger than the second radius. In FIG. 4B these sections with the second (smaller) radius are shown closest to each other such that a nip 4.5 is provided in between the rollers of the catch and drawing means 4.2 that allows that the softer part 4.3 of the organ package can be caught in the nip 4.5 such that it enters into one of the slits 4.6, 4.7 next to a central tongue 4.1 of the cutter. The catch and drawing means 4.2 effectively catch the softer part 4.3 of the organ package due to rotation of the rollers thereof. The rollers are arranged to close the nip 4.5 by having the sections with their first radius move close to each other. Due to this movement the softer part 4.3 of the organ package is gripped and drawn further into one of the slits 4.6, 4.7 adjacent to the central tongue 4.1. Cutting edges that are provided at this central tongue 4.1 respectively at the edges of the slits 4.6, 4.7 cause the tissue connections between the part of the organ package on top of the separator and the part of the organ package below the separator to be broken.

With reference again to FIG. 3, subsequent to the first separator 3.6 the remainder of the organ package is fed via a chute 3.7 onto a second separator 3.9 having an exit 3.10 for the heart removed from the organ package, an exit 3.13 for the liver that is removed from the organ package, and an exit 3.14 for the gizzard that is removed from the organ package. Also, there is an exit 3.15 provided below the organ harvester that is intended for disposal of all the inedible parts of the organ package. The operation of the second separator 3.9 of the organ harvester shown in FIG. 3 that is located behind the first separator 3.6 is further discussed hereinafter with reference to FIGS. 7 and 8.

Figure 7:
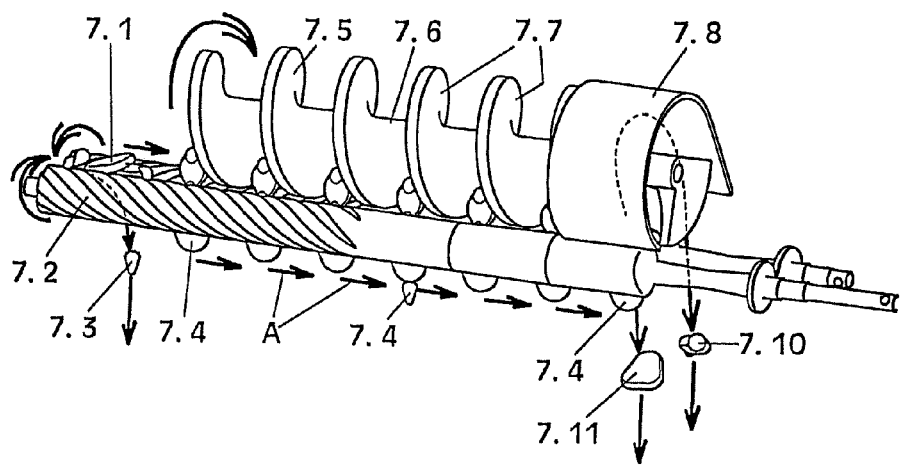
FIG. 7 and FIG. 8 show the second separator of the organ harvester of FIG. 3 with (FIG. 7) and without (FIG. 8) gizzard guide means.
Figure 8:
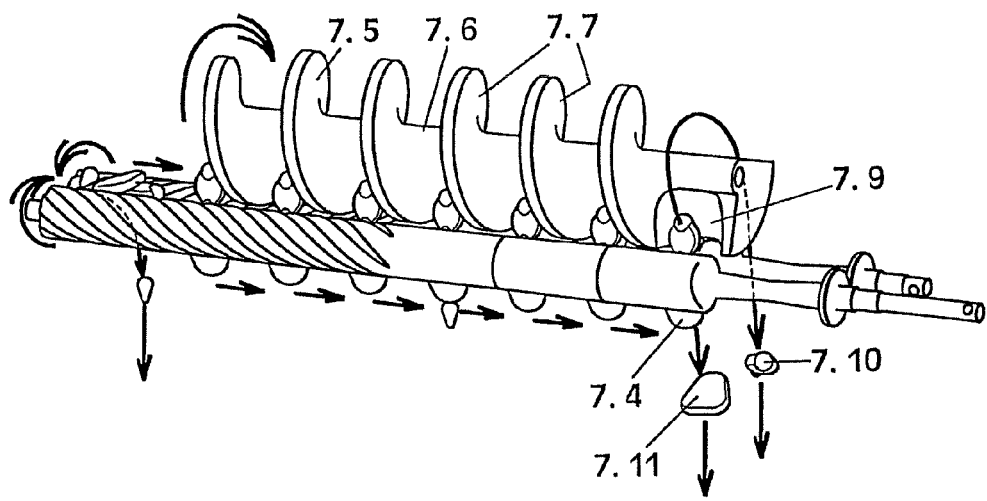

As mentioned with reference to FIG. 3 the organ package is provided to the second separator shown in FIGS. 7 and 8 by passing it thereon via a chute 3.7. The organ package 7.1 drops then onto cooperating rollers 7.2, which rollers have pitched grooves on their outer surfaces. The cooperating rollers have sufficient space between them to allow the heart and liver to be separated to pass in between. Due to the pitched grooves, the heart 7.3 and liver 7.4 are pulled underneath said rollers 7.2 and the remainder of the organ package 7.1 is conveyed further in the conveying direction indicated with the arrows A. Preferably the nip between the rollers 7.2 is adjustable so as to be able to selectively define the position at which the heart 7.3 and liver 7.4 will pass the nip between said rollers 7.2.

Above the rollers 7.2, a screw transporter 7.5 is provided in order to effect conveyance of the remainder of the organ package that resides on top of the rollers 7.2 particularly at the part of the rollers where no pitched groove is applied.

When moving further to the right from the position where the heart 7.3 and the liver 7.4 have passed the opening in between the rollers 7.2, the opening has a diminishing dimension so as to prevent the further passage of the remainder of the organ package on top of the rollers 7.2.

As both FIG. 7 and FIG. 8 clearly show, the screw transporter 7.5 comprises an axis 7.6 that circumferentially is provided with a spiraling wall 7.7 such that adjacent parts of said wall 7.7 are spaced apart so as to receive an organ from the organ package there between. As said, this organ, notably the gizzard with the pre-stomach attached thereto, is supported by the rollers 7.2.

At the end of the conveying direction in which the screw transporter 7.5 moves the remainder of the organ package, there is a so-called gizzard guide 7.8, which for clarity purposes is not shown in FIG. 8. This allows FIG. 8 to show that the screw transporter 7.5 is provided with a closing wall 7.9 near the exit of the screw transporter that connects adjacent parts of the spiraling wall 7.7.

Due to the combined operation of the closing wall 7.9 at the exit of the screw transporter 7.5 and the gizzard guide 7.8 shown in FIG. 7, tissue connections are broken that connect the gizzard and pre-stomach to parts of the organ package that are caught between and below the nip of the rollers 7.2 by pulling the gizzard with pre-stomach away and tearing thereby the tissue connections so as to eventually allow the gizzard with pre-stomach to exit as indicated with reference numeral 7.10. The liver 7.11, which up to that point has remained attached to the gizzard, is allowed to exit at 7.11 as well.

Figure 9:
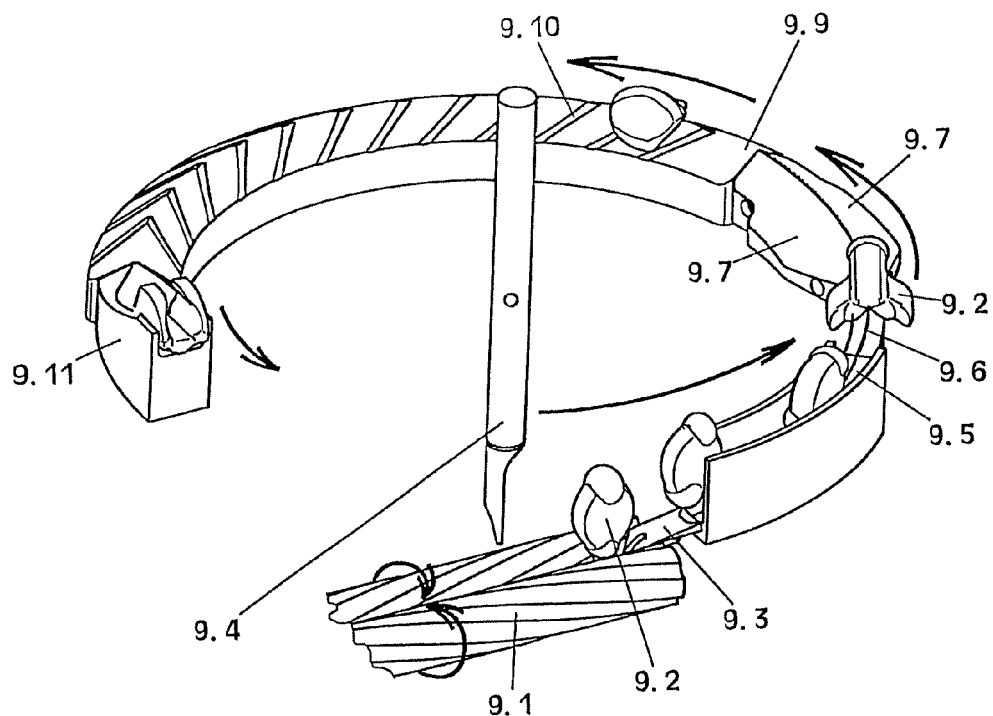
FIG. 9 shows a gizzard processing device in accordance with an exemplary embodiment of the invention.

The gizzard and the pre-stomach that attaches thereto can be processed further in a gizzard processing device as schematically shown in FIG. 9. To this end the gizzard and the pre-stomach can be fed to cooperating rollers 9.1 via an in-feed 10 of a chute 18 as shown in FIG. 1. Feeding in the gizzard and pre-stomach can be done in a random orientation since the cooperating rollers 9.1 arrange that the gizzard 9.2 assumes an upright position with the pre-stomach being caught below the gizzard 9.2 in the nip between the rollers 9.1. The rollers 9.1 are further provided with a helical groove causing the gizzard-package to be transported in the direction of a cutting device 9.3 at which the pre-stomach is separated from the gizzard 9.2. A pusher 9.4 arranges for the movement of the gizzard 9.2 such that it arrives at a slope portion 9.5 of the gizzard processing device, which is provided with a centrally positioned knife 9.6 and slopes 9.7 extending on both sides of the knife 9.6 at a predetermined angle with respect to the knife 9.6. This slope section cuts the gizzard 9.2 gradually open while spreading both sides of the gizzard that are separated from each other into a so called butterfly shape while releasing stones and other contents from the gizzard. To this end the slopes 9.7 gradually develop in the conveying direction of the gizzard 9.2 so as to cause the gizzard to be spread widely open into a completely opened shape.

The gizzard processing device is further provided with a washing beam 9.9 for the gizzard, having grooves 9.10 at which water supply outlets extend for washing out the gizzard contents that has not yet left the gizzard after it's being cut open by the knife 9.6. The washer outlets are not shown in the Figure, however it is completely clear for one of ordinary skill in the art how to implement same. At reference numeral 9.11, the gizzard processing device has a part which folds the gizzard inside-out such that it maybe further cleaned and peeled in a subsequent gizzard peeler as shown in FIGS. 10-12.

Figure 10:
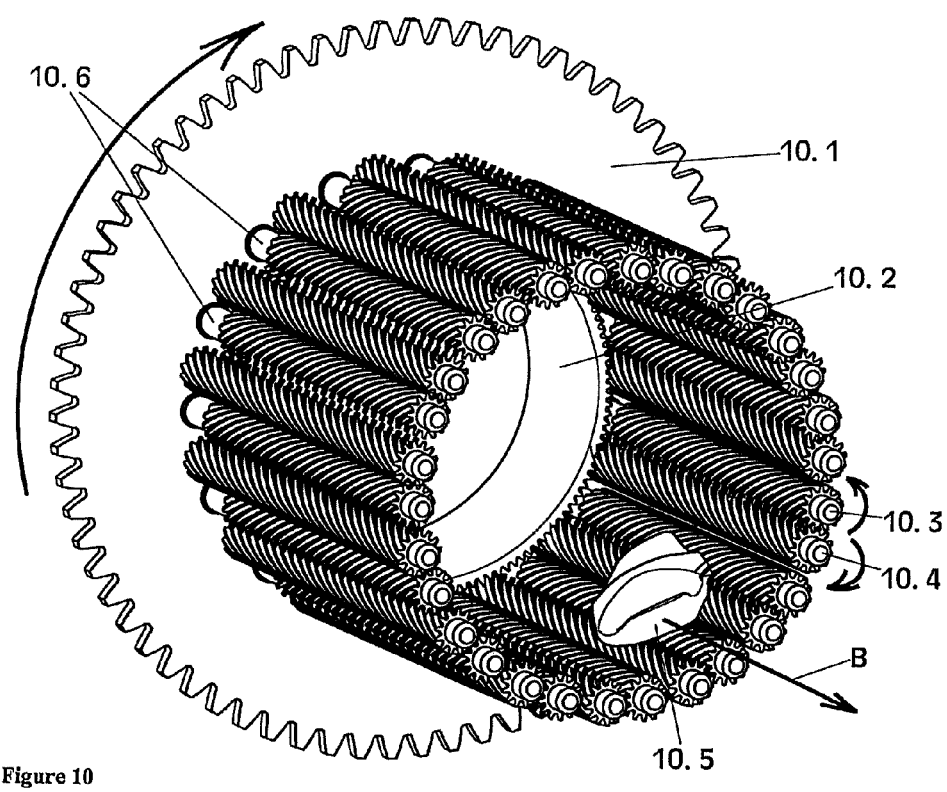
FIG. 10 and FIG. 11 show a first and a second embodiment of a gizzard peeler in accordance with an exemplary embodiment of the invention.
Figure 11:
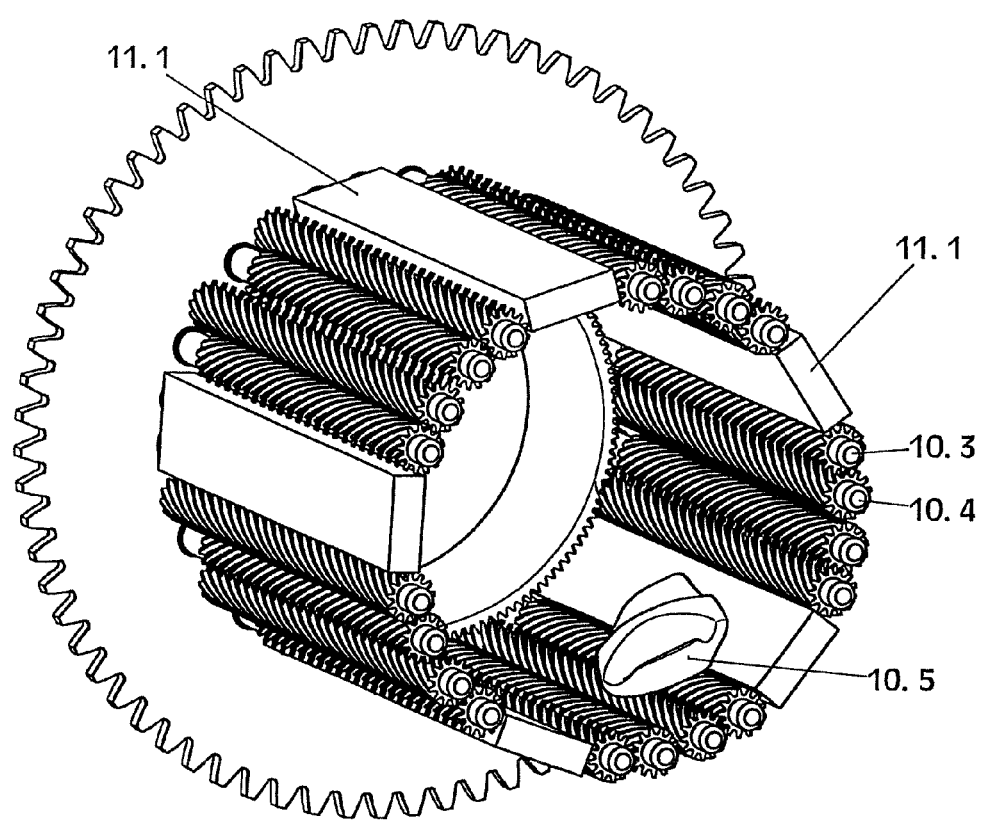
Figure 12:
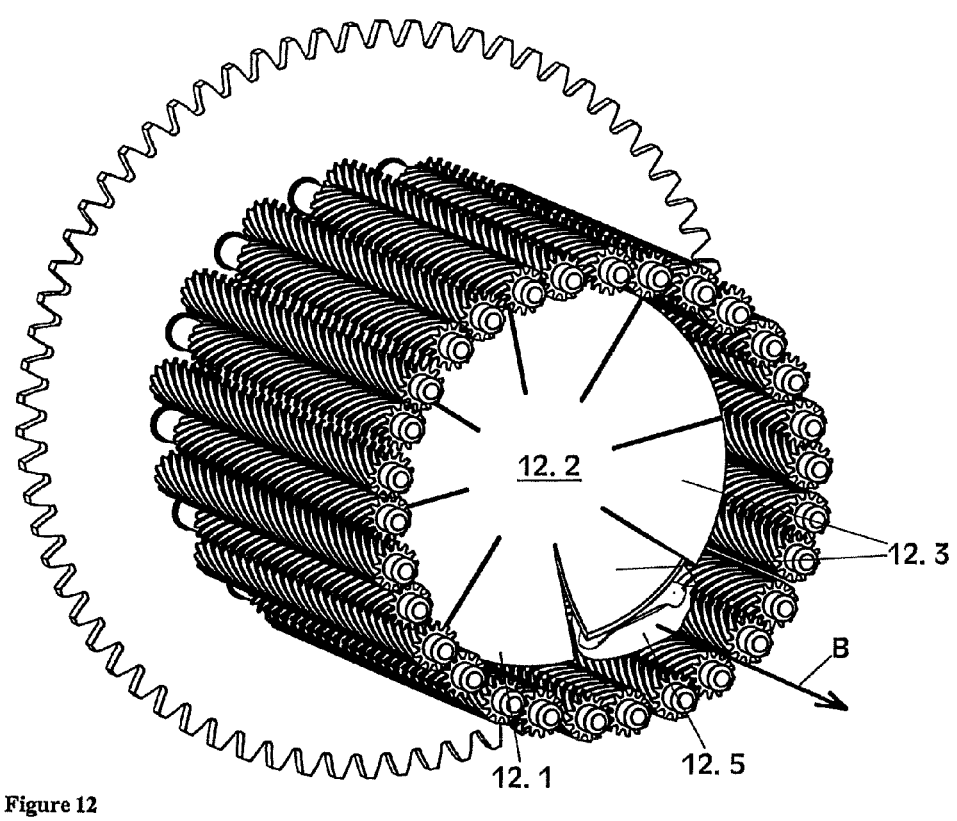
FIG. 12 shows a further embodiment of a gizzard peeler which is developed from the embodiment shown in FIG. 10.

The gizzard peeler as shown in FIGS. 10-12 comprises a series of rollersets 10.3, 10.4. Each rollerset comprises a first roller 10.4 and a second roller 10.3 that in use rotate in opposite directions.

As both FIG. 10 and FIG. 11 further clearly show, each of the rollersets 10.3, 10.4 partly borders a space for receipt of the gizzard 10.5 and the rollersets 10.3, 10.4 collectively form a substantially cylindrical case for said gizzard (see FIG. 10) or form part of such a case as shown in FIG. 11.

In FIG. 11 some rollersets are replaced by plates 11.1, which plates however together with all the rollersets shape the case in which the gizzard 10.5 is received.

During operation, the rollersets 10.3, 10.4 are rotatable around a central body axis of the case such that the case constitutes a revolving enclosure for the gizzard 10.5, and the individual rollers 10.3, 10.4 execute a combined dual rotation both along their own axis and around the central body axis of the case.

Schematically both FIG. 10 and FIG. 11 further show that the first roller 10.4 has teeth that intermesh with a gear 10.2. There is a rotatable plate 10.1 that is provided with a circular series of holes 10.6. Each of these holes is intended to receive an axis, for instance the axes of the first rollers 10.4. Further the first rollers 10.4 and second rollers 10.3 have intermeshing teeth. Due to the combined operation of these intermeshing teeth of the first rollers 10.4 and second rollers 10.3, the rotation of the plate 10.1 causes that the first rollers 10.4 will rotate around their own axes. Due to the static positioning of the gear 10.2 consequently also the second rollers 10.3 will rotate albeit in the opposite direction of first rollers 10.4 due to the intermeshing teeth of the first and second rollers 10.4, 10.3.

FIGS. 10 and 11 further show that the intermeshing teeth of the first and second rollers 10.3, 10.4 are helically shaped which not only promotes the peeling action on the gizzards 10.5, but also promotes movement of the gizzards 10.5 in the conveying direction indicated with arrow B.

FIG. 12 shows that the gizzard peeler may be provided with a stopper disc 12.1 between the peeler's in-feed and its exit. This stopper disc 12.1 preferably has a central portion 12.2 that is circumferentially provided with resilient flaps 12.3 to delay the movement of the gizzard 12.5 in its conveying direction indicated with arrow B, causing that the peeling action on the gizzard 12.5 is prolonged.

Although not shown in the figures, the gizzard peeler may be provided with a washing unit, such as a washing drum, at its in-feed and/or its exit.

It should be understood that the present invention includes various other modifications that can be made to the exemplary embodiments described herein that come within the scope of the appended claims and their equivalents. These and other embodiments of the present invention are with the spirit and scope of the claims that now follow.

The invention claimed is:

1. A processing line for harvesting organs from an organ package removed from slaughtered poultry, the organ package including a duodenum, gizzard, and one or more of the group comprising a heart, liver, and prestomach, the processing line comprising:
   an organ harvester positioned for the receipt of the organ package, said organ harvester defining a conveying direction for the organ package, said organ harvester comprising:
      a first endless belt that is configured for rotation with a direction of movement that is perpendicular to the conveying direction;
      a transport unit positioned adjacent to said endless belt, said transport unit selected from the group comprising a second endless belt that is configured for rotation or a roller, wherein said first endless belt and said transport unit rotate in opposite rotational directions; wherein said first endless belt and said transporter are configured for moving and orienting the organ package such that the duodenum of the organ package hangs below the remainder of the organ package;
   first separator configured for receipt of the organ package with the duodenum hanging below the remainder of the organ package, said first separator configured for separating at least a duodenum from the organ package;
   a second separator configured for separating one or more organs other than a gizzard from the organ package, said second separator positioned after said first separator with regard to the movement of the organ packages through the processing line; and
   a gizzard processing device positioned for the receipt of the remainder of the organ package from said second separator, the gizzard processing device configured for separating the gizzard from any other portion of the organ package remaining after said second separator.

2. A processing line as in claim 1, further comprising one or more stopping elements positioned adjacent to said transport unit and configured for contact with the organ packages so as to slow the movement of the organ packages along said transport unit.

3. A processing line as in claim 1, wherein said gizzard processing device further comprises a gizzard peeler.

4. A processing line as in claim 1, wherein said endless belt and said transport unit each are provided circumferentially with cooperating grooves that during operation move in opposite rotational directions.

5. A processing line as in claim 1, wherein said organ harvester further comprises a pair of rollers positioned upstream from, and adjacent to, said endless belt and transport unit, said pair of rollers rotating in opposite directions and creating an opening that allows the duodenum to pass through.

6. A processing line as in claim 5, wherein said pair of rollers are conically-shaped.

7. A processing line as in claim 1, wherein adjacent to said transport unit said first endless belt has grooves that are shaped as part of a pitched groove.

8. A processing line as in claim 1, wherein said first endless belt and said transport unit defining a nip through which the duodenum passes through.

9. A processing line as in claim 1, wherein said second separator comprises at least two cooperating first rollers that include grooves along their circumference, said first rollers defining an adjustable nip between said first rollers for selectively allowing preselected organs from said organ package to pass through, said first rollers configured to rotate in opposite directions so as to simultaneously convey the organ package and pass the preselected organs through the nip.

10. A processing line as in claim 9, wherein said second separator further comprises a screw transporter.

11. A gizzard processing device, comprising:
   an infeed for an unprocessed gizzard-package that comprises a gizzard and a pre-stomach, said infeed comprising cooperating rollers having helically shaped grooves for positioning a gizzard-package in an upright position with the gizzard above the pre-stomach, and for transporting the gizzard-package along a conveying direction;
   a non-rotating cutting device positioned over an end of said cooperating rollers and comprising a centrally positioned knife having slopes on opposing sides of said knife, the slopes each having an angle that gradually develops along the conveying direction, the slopes of said cutting device configured to cut the gizzard gradually open while spreading open the gizzard ; and
   at least one exit for one or more parts of the gizzard-package.

12. A gizzard processing device as in claim 11, wherein said knife is positioned over said cooperating rollers.

13. A gizzard processing device as in claim 12, wherein the slopes of said knife extend symmetrically on both sides of said knife.

14. A gizzard processing device as in claim 13, wherein the slopes cause the gizzard, after being cut by said knife, to be spread into a completely opened, butterfly shape.

15. A gizzard processing device as in claim 13, further comprising a washing beam for the gizzard that includes grooves and a water supply having its outlet or outlets in the grooves for washing out the gizzard's contents.

16. A gizzard processing device as in claim 15, wherein the washing beam is located behind the slopes along the conveying direction of the gizzard.

\* \* \* \* \*